Dec. 19, 1961 D. F. CARLISLE 3,014,162
METER SOCKET FOR PLUG-IN METERS
Filed Aug. 28, 1958
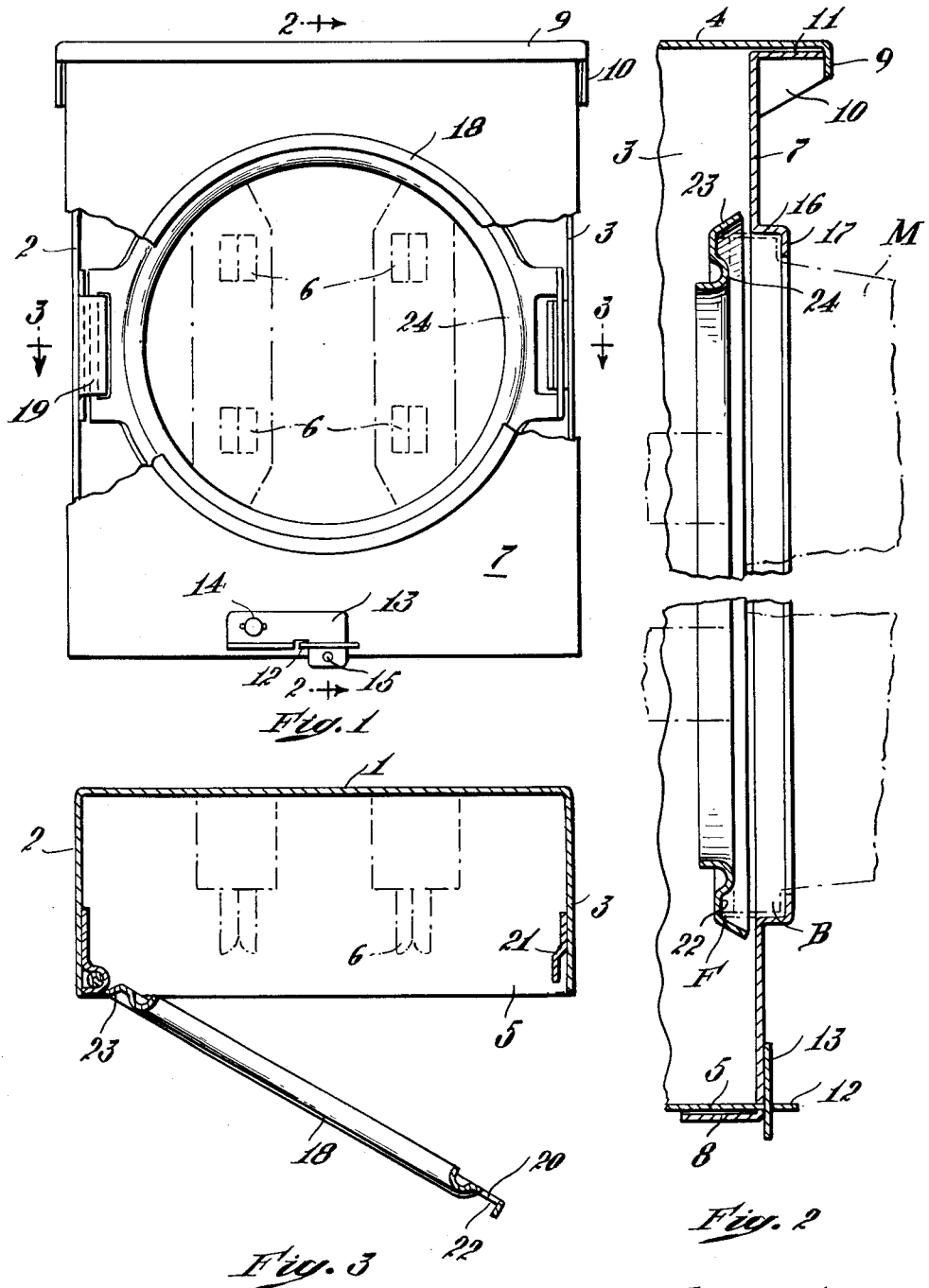
Inventor
Duane F. Carlisle
by Roberts, Cushman & Grover
Att'ys United States Patent Office 3,014,162
Patented Dec. 19, 1961

3,014,162
METER SOCKET FOR PLUG-IN METERS
Duane F. Carlisle, Durham, N.H., assignor, by mesne assignments, to Basic Products Corporation, Milwaukee, Wis., a corporation of Wisconsin
Filed Aug. 28, 1958, Ser. No. 757,846
6 Claims. (Cl. 317—109)

In meter boxes of the type which have jaws to receive blades on the back of a meter, it is customary to provide on the front of the box a cover having a circular opening through which the meter is inserted, the cover having an outturned flange around the meter opening to cooperate with a sealing ring applied after the meter is inserted. An example of boxes of this type is disclosed in the patent to Johansson, 2,297,833. Constructions of this type sometimes require two seals to prevent unauthorized access to the box, one to seal the cover on the box and one to seal the meter to the cover by means of the aforesaid sealing ring.

Objects of the present invention are to eliminate one of the aforesaid seals and to provide a construction which meets all weatherproofing requirements, which is simple and economical in construction, which affords ready access to the interior of the box in making a new installation or making tests after installation of the meter and which is durable and reliable in use.

According to the present invention the meter socket has bottom and side walls but is open on the front and a cover with a meter opening fits over the open front, characterized by a ring surrounding the meter position at the front of the box with a space between the ring and side walls, the ring having an annular surface on which the face of the meter seats and outside the annular surface a forwardly projecting flange to overlap the meter base, the cover also having a flange overlapping the meter base. Preferably the aforesaid ring has a groove to receive the peripheral flange on the meter base. In the preferred embodiment the ring is hinged on one of the side walls to swing out of the way while working inside the socket, and the flange around the meter opening in the cover extends forwardly along the periphery of the meter base and thence turns inwardly in the front of the base. Preferably the top side of the box projects forwardly beyond the plane of the cover and the cover has a flange extending forwardly from said plane under the projecting top side of the box, the top side having a front flange depending in front of the cover flange.

For the purpose of illustration a typical embodiment of the invention is shown in the accompanying drawings in which:

FIG. 1 is a front view with a part of the cover broken away;

FIG. 2 is a section on line 2—2 of FIG. 1; and

FIG. 3 is a section on line 3—3 of FIG. 1 with the aforesaid meter ring swung outwardly to afford access to the interior of the box.

The particular embodiment of the invention chosen for the purpose of illustration comprises a box having a back 1, side walls 2 and 3, a top 4, a bottom 5 and jaws 6 to receive meter blades. Fitted over the open front of the box is a cover 7 having a peripheral flange 8 at the sides and bottom to telescope over the box. The top of the box projects forwardly beyond the plane of the cover and has a flange 9 depending in front of the cover, the flange 9 being braced at each end by extensions 10 on the side walls. At its upper end the cover has a flange 11 extending forwardly under the top of the box to the depending flange 9. At the bottom the cover is provided with a slot to receive an extension 12 on the bottom of the box, the extension having a slot to receive a latch 13 pivotally mounted on the cover at 14, the latch having an opening 15 to receive a seal. Around the meter opening in the cover is a flange comprising a forwardly projecting portion 16 and an inturned portion 17 overlapping the front of the face B of the meter M.

The aforesaid meter ring 18 is pivotally mounted on one side of the box by means of a hinge 19 and at its opposite side it has a slot 20 to receive a strap 21 fast to the box thereby to hold the ring firmly in position when it is swung to the closed position shown in FIGS. 1 and 2. The ring 18 has an annular groove 22 to receive the peripheral flange F of the meter base and outside the groove is a forwardly projecting flange 23 overlapping the flange F. Inside the groove 22 is a seat 24 which is curved in cross section and which engages the base of the meter inside the flange F.

To assemble the parts the ring 18 is swung open to give access to the interior parts. After the box has been mounted and wired the ring 18 is swung to closed position and the meter is inserted. Then the cover 7 is applied by hooking the flange 11 behind the flange 9 with the cover inclined outwardly and downwardly and then swinging the cover to the closed position shown in FIGS. 1 and 2. The flanges 9, 11, 16 and 17 afford adequate protection against water getting into the box and only one seal is required to prevent unauthorized access to the interior of the box.

It should be understood that the present disclosure is for the purpose of illustration only and that this invention includes all modifications and equivalents which fall within the scope of the appended claims.

I claim:

1. For a meter of the plug-in type having a base and a rearwardly projecting flange around the base, a meter socket having a bottom and side walls but being open on the front, a ring surrounding the meter position at said front with a space between the ring and side walls, the ring having an annular surface on which said base seats, outside said surface a groove to receive said flange, a cover bridging said space, the cover having an opening for the meter and, around said opening, a flange overlapping said base.

2. A meter socket according to claim 1 further characterized by means for hinging said ring on one of said walls to swing to one side while working inside the socket.

3. A meter socket according to claim 1 further characterized in that said cover flange extends forwardly from the cover along the periphery of said base and thence inwardly in front of the base.

4. A meter socket according to claim 1 further characterized in that the cover has a flange at its upper end which extends along the underside of the top side of the socket.

5. A meter socket according to claim 4 further characterized in that the top side of the box projects forwardly beyond the plane of the cover and said cover flange extends forwardly.

6. A meter socket according to claim 5 further characterized in that said top side has a front flange depending in front of said cover flange.

References Cited in the file of this patent

UNITED STATES PATENTS

| 2,044,643 | Sloop | Jan. 16, 1936 |
| 2,166,003 | Green | July 11, 1936 |
| 2,429,093 | Johansson | Oct. 14, 1947 |
| 2,715,700 | Rothstein | Aug. 16, 1955 |
| 2,866,936 | Moore | Dec. 30, 1958 |
| 2,907,928 | Rutledge | Oct. 6, 1959 |

FOREIGN PATENTS

| 333,321 | Germany | Feb. 22, 1921 |